United States Patent [19]

Blankenhorn et al.

[11] 4,091,148

[45] May 23, 1978

[54] METHOD OF IMPREGNATING CONCRETE

[76] Inventors: Paul Richard Blankenhorn, 106 Horseshoe Cir., Pennsylvania Furnace, Pa. 16865; David Andrew Whiting, 1883 Willow Hill Ct., Northfield, Ill. 60093; Donald Edgar Kline, 1210 E. Branch Rd., State College, Pa. 16801

[21] Appl. No.: 739,977

[22] Filed: Nov. 8, 1976

[51] Int. Cl.² ............................................. B05D 3/02
[52] U.S. Cl. ........................... 427/314; 427/385 C; 427/386; 428/413; 52/309.1
[58] Field of Search ............ 427/314, 386, 385 C, 427/430 B, 444, DIG. 3; 428/413, 538; 52/309.1, 517, 515

[56] References Cited

U.S. PATENT DOCUMENTS

| | | | |
|---|---|---|---|
| 1,383,749 | 7/1921 | Osborne | 427/314 |
| 2,259,935 | 10/1941 | Johnson | 427/314 |
| 2,934,452 | 4/1960 | Sternberg | 428/413 |
| 3,027,294 | 3/1962 | Bettoli et al. | 264/133 |
| 3,145,502 | 8/1964 | Rubenstein | 52/223 |
| 3,447,955 | 6/1969 | Wittenwyler | 428/413 |
| 3,510,339 | 5/1970 | Wile | 427/386 |
| 3,516,847 | 6/1970 | Schuster et al. | 427/314 |
| 3,795,533 | 3/1974 | Gauri | 427/DIG. 3 |
| 4,002,708 | 1/1977 | Lott | 264/133 |

FOREIGN PATENT DOCUMENTS

| | | | |
|---|---|---|---|
| 567,358 | 12/1958 | Canada | 427/386 |
| 908,522 | 8/1972 | Canada | 427/386 |
| 1,492 of | 1863 | United Kingdom | 428/538 |
| 125,506 | 7/1954 | U.S.S.R. | 427/314 |

*Primary Examiner*—Ronald H. Smith
*Assistant Examiner*—Sadie L. Childs
*Attorney, Agent, or Firm*—Paul Lipsitz

[57] ABSTRACT

A process for impregnating concrete which comprises:
(a) partially drying said concrete to a moisture content of from about 4% to about 8% by weight,
(b) impregnating said dried concrete by allowing it to absorb a liquid epoxy resin at elevated temperature and at atmospheric pressure, and
(c) curing said epoxy resin in situ by heating said impregnated concrete to a temperature of from about 150° C. to about 200° C. for at least about 24 hours, using as catalyst the water remaining in said partially dried concrete.

4 Claims, 1 Drawing Figure

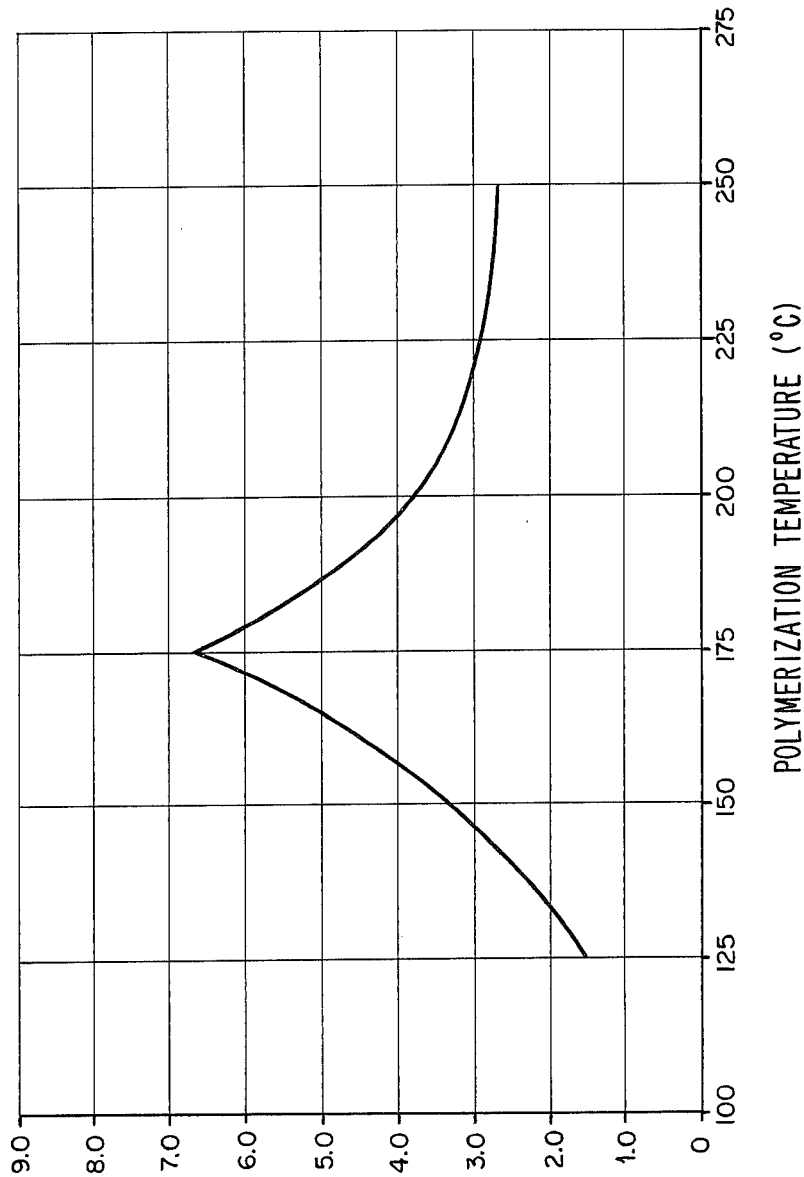

METHOD OF IMPREGNATING CONCRETE

It is known in the art that many of the physical properties of concrete can be greatly improved by polymer impregnation. The accepted procedure is to dry the concrete, introduce the monomer with appropriate catalyst or curing agent and subsequently polymerize the monomer. This process produces polymer impregnated concrete (PIC) which has a reduced porosity as compared to conventional concrete. Porosity is usually considered to be one of the major factors limiting many of the useful properties of concrete such as compressive strength, elastic modulus, creep, and durability. Hence, polymer impregnated concrete displays large increases in strength, modulus, resistance to corrosion and freeze-thaw durability as compared to unimpregnated concrete.

Except for radiation induced polymerization of the impregnated monomers, the monomer and catalyst or curing agent must be mixed together prior to the impregnation step. These monomer-catalyst systems thus require that polymerization be achieved within a relatively short period of time. Certain production or installation advantages could be obtained if the concrete could be impregnated with a monomer system which did not contain a catalyst or curing agent, and yet polymerization could be triggered when desired.

It is an object of this invention to provide means to impregnate concrete with a resin which significantly improves the concrete properties and to be able to control the polymer curing step.

A further object is to impregnate concrete with an epoxy resin without the necessity of using pressure or vacuum.

Another object of the invention is to cure an epoxy resin impregnated in concrete without the use of an added curing agent.

A still further object is to be able to choose the time at which polymerization be made to occur by triggering the polymerization reaction.

In accord with the invention a process is provided for impregnating concrete which comprises:

(a) partially drying said concrete to a moisture content of from about 4% to about 8% by weight, (b) impregnating said dried concrete by allowing it to absorb a liquid epoxy resin at a temperature between about 75° and about 125° C. and at atmospheric pressure, and (c) curing said impregnated epoxy resin in situ by heating said impregnated concrete to a temperature from about 150° to about 200° C. for at least about 24 hours, using as curing agent the water remaining in said dried concrete.

As indicated, the first step of the process involves partially drying the concrete to a specific moisture level of from about 4% to about 8% by weight. At the 4% level there will be one molecule of water absorbed in the capillary structure for each molecule of epoxy moeity. At the 8% level there will be two water molecules per epoxy moeity. Thus, drying will be carried out to the point at which only one to two molecules of water per epoxy molecule is present in the concrete and it is preferred to dry to the 4% level. Drying may be carried out in the case of small concrete structures by placing in an oven or, with large structures, infrared heaters or alternate drying techniques may be used. It has been determined that with oven drying, suitable drying of the concrete is achieved after 24 hours at 105° C.

Determination of the desired moisture level is readily done on an empirical basis. Alternatively, the prior art techniques of using surface temperature rate change or temperature measurement at the desired depth may be used; these techniques are described in preprint MTL-5 of the ASCE/EIC/RTAC Joint Transportation Engineering Meeting held at Montreal July 15-19, 1974 which article is authored by P. R. Blankenhorn, et al.

The impregnation step is carried out by a soaking technique at elevated temperatures without the use of pressure or vacuum and this is a significant advantage of the process. The soaking technique of this invention simply involves either surrounding the concrete with the liquid resin or placing it on the concrete surface and allowing it to soak into the concrete interior. The soaking will be carried out at elevated temperatures sufficiently high to reduce the viscosity of the resin, but not high enough to trigger polymerization. About 75° C. is a typically useful temperature, and, in general, the temperature range for this soaking step will be between about 75° C. and about 125° C. No pressure or vacuum need be applied to the system, the impregnation step preferably being carried out at autogenous pressure which will be atmospheric pressure, but pressure or vacuum may be used, if desired, to reduce the time for the impregnation to occur.

The resins used in impregnation will be the conventional epoxy resins known in the art (see for example, "Polymer Processes," Schildkneckt, pp. 429-474, 1956). Preferably, the reaction product of epichlorohydrin and bisphenol A (e.g., 2,2-bis-p-hydroxyphenyl)-propane will be used, but other epoxy resins are also useful such as an aliphatic based resin such as that from epichlorohydrin and glycerine (Epon 812, 826 and 828 made by Shell Chemical Co.), and the glycidyl ethers of novalac resins derived from polyhydric phenols by condensation with an aldehyde followed by reaction with epichlorohydrin in the presence of alkali. Other epoxy resins known in the art and commercially available will also be of value.

Impregnation is allowed to proceed until essentially complete penetration occurs or uptake of resin stops. This may require several hours to several weeks depending upon the size, thickness, shape and porosity and composition of the concrete. An advance core sample of the concrete to be impregnated and a preliminary test with the epoxy resin mixture is quite helpful in determining how long a time is required for the desired penetration.

As indicated above, the epoxy resin is used without a curing agent. That is, none of the conventional amines or other type curing agent is incorporated in the resin.

When the impregnation of the concrete with epoxy resin is completed the curing step is implemented. This is readily accomplished by heating the impregnated concrete to a temperature of from about 150° to about 200° C., preferably about 175° C. for at least about 24 hours. The water remaining in the concrete acts as the curing agent and the heat acts as a trigger to initiate the curing reaction. It is critical that the curing temperature be controlled so that it is kept between about 150° and 200° C. since it has been found that with temperatures outside this range the physical properties of the concrete, particularly compressive strength, are significantly less than optimum.

Attention is directed to the FIGURE which illustrates the strength factor of the impregnated concrete versus the polymerization temperature. As will be seen, the maximum strength is obtained at 175° C. and strength falls off rapidly on either side. Significantly high strength of the impregnated, cured concrete is obtained at polymerization temperatures of from about 150° to 200° C.

In order to further describe and illustrate the process of the invention, the following examples are given:

EXPERIMENTAL

All specimens were prepared in accordance with standard ASTM specifications (C192-69) and cast into cardboard molds 3 inches in diameter × 6 inches in length. Portland cement (Type I) was used as the binder with Montoursville sand and crushed limestone as aggregates. An air entraining agent (Darex) was added to all mixes. Typical batch mixtures are given in Table 1.

In the present study the epoxy resins used were Epon ® 826, 828, and 812.

TABLE I

| | BATCH QUANTITIES | | | | |
|---|---|---|---|---|---|
| | 1 | 2 | 3 | 4 | 5 |
| Material/batch | w/c = 0.63 | w/c = 0.48 | w/c = 0.77 | w/c = 0.64 | w/c = 0.66 |
| cement | 27 lbs. | 24.4 lbs. | 24.4 lbs. | 26.5 lbs. | 25.8 lbs. |
| sand | 67 lbs. | 82 lbs. | 79.2 lbs. | 72.6 lbs. | 73.0 lbs. |
| C.A.* | 88 lbs. | 81.9 lbs. | 81.6 lbs. | 83.9 lbs. | 84.1 lbs. |
| Water | 17 lbs. | 11.6 lbs. | 18.7 lbs. | 16.9 lbs. | 16.9 lbs. |
| AEA (ml)** | 8 ml | 5.7 ml | 5.7 ml | 6.25 ml | 6.1 ml |
| Slump | 5.5 in. | 1.5 in. | 3.5 in. | 4.5 in. | 2.5 in. |

*Maximum coarse aggregate (C.A.) ¾"
**Air entraining agent

Although the batch mixtures in Table I differ, for example w/c varies from 0.48 to 0.77, it has been shown that most of the variations in the original concrete mix design do not radically alter the final compressive strength values obtained when the concrete is impregnated. In general, it appears that the resultant properties of polymer impregnated concrete are more a function of polymer loadings in the concrete, up to the maximum saturation of polymer in the concrete, than concrete mix design.

The specimens were hydrated for 3 days at 100% relative hymidity at 20° C. Early age concrete is easier to impregnate because of the increased porosity and larger overall pore size in the concrete. Similar to the mix design discussion above, it appears that final compressive strength values for shorter hydration times are not affected to any appreciable degree and that the strength values are more a function of polymer loading than hydration time.

A series of concrete cylinders were made and the specimens were hydrated for 3 days after which they were placed in an oven at 105° C. for 24 hours, after wich time the specimens contained about 4.2% water.

The dried specimens were soaked in the various epoxy resins for 14 days at 75° C. and polymerization temperatures of 125°, 150°, and 175° C. for each resin were used. Data on this series of specimens are given in Table II and as can be seen, the average compressive strength increased as polymerization temperature increased for each resin.

Another series of specimens were similarly hydrated for 3 days and dried for 24 hours at 105° C. These specimens were soak impregnated for 7 days at 75° C. with an 828/812 (50-50 by wt.) mixture. The data for these specimens are given in Table III. Compressive strength data in Table III indicate that as the polymerization temperature increases, the average compressive strength decreases and the data from Tables II and III show maximum compressive strength being obtained by polymerizing at temperatures of from about 150° to about 200° C.

The process of the invention is of particular value for use with large concrete structures in the field, particularly bridge decks which frequently need reinforcement after hard usage and abuse. As indicated above, the method lends itself to field implementation and enables large, completed structures in the field to be given increased strength, corrosion resistance and freeze-thaw durability. It is thus clear that the method represents a significant improvement in the art.

TABLE II

| Specimen | $W_s$ Saturated Gm | $W_o$* 24 Hr at 105° C Gm | Resin System and Polymerization Temp | $W_f$ Impregnated Gm | % Vol. Loaded | Comp Str Psi | Ave Comp Str. Psi |
|---|---|---|---|---|---|---|---|
| 3 P1 | 1604.5 | 1459.0 | 828 | 1594.4 | 16.8 | 3350 | 3500 |
| 3 P2 | 1615.1 | 1475.2 | 125° C. | 1605.2 | 16.2 | 3690 | |
| 3 P3 | 1615.8 | 1468.5 | | 1605.9 | 17.1 | 3450 | |
| 3 P4 | 1619.4 | 1477.9 | 828 | 1611.9 | 16.7 | 4960 | 4980 |
| 3 P5 | 1598.0 | 1451.5 | 150° C. | 1592.5 | 17.6 | 5010 | |
| 3 P6 | 1626.4 | 1492.7 | 828 | 1620.6 | 15.9 | 8910 | 8020 |
| 3 P7 | 1611.9 | 1472.4 | 175° C. | 1604.9 | 16.5 | 7360 | |
| 3 P8 | 1617.0 | 1473.7 | | 1607.8 | 16.7 | 7780 | |
| 3 P9 | 1610.3 | 1473.9 | 828/812 | 1608.2 | 16.7 | 2330 | 2180 |
| 3 P10 | 1613.0 | 1468.1 | (50—50) | 1608.4 | 17.5 | 1630 | |
| 3 P11 | 1600.7 | 1463.5 | 125° C. | 1598.4 | 16.8 | 2570 | |
| 3 P12 | 1590.0 | 1443.3 | 828/812 | 1589.4 | 18.2 | 3070 | 2940 |
| | | | (50—50) | | | | |
| 3 P13 | 1603.2 | 1465.1 | 150° C. | 1602.5 | 17.1 | 2810 | |
| 3 P14 | 1609.2 | 1468.8 | 828/812 | 1605.4 | 17.0 | 10110 | 9670 |
| 3 P15 | 1612.1 | 1471.7 | (50—50) | 1610.5 | 17.3 | 9920 | |
| 3 P16 | 1603.7 | 1462.9 | 175° C. | 1602.4 | 17.4 | 8980 | |
| 3 P17 | 1601.0 | 1451.4 | 826 | 1593.2 | 17.7 | 4000 | 3940 |
| 3 P18 | 1622.4 | 1485.9 | 125° C. | 1615.4 | 16.1 | 4060 | |
| 3 P19 | 1610.3 | 1472.3 | | 1603.6 | 16.4 | 3750 | |
| 3 P20 | 1617.9 | 1479.4 | 826 | 1610.5 | 16.3 | 5810 | 6040 |
| 3 P21 | 1613.7 | 1476.1 | 150° C. | 1605.9 | 16.2 | 6500 | |
| 3 P22 | 1592.5 | 1447.8 | | 1583.0 | 16.0 | 5810 | |
| 3 P23 | 1612.6 | 1472.6 | 826 | 1600.7 | 16.0 | 10250 | 9030 |
| 3 P24 | 1612.1 | 1472.1 | 175° C. | 1604.3 | 16.5 | 7070 | |

TABLE II-continued

| Specimen | $W_s$ Saturated Gm | $W_o$* 24 Hr at 105° C Gm | Resin System and Polymerization Temp | $W_f$ Impregnated Gm | % Vol. Loaded | Comp Str Psi | Ave Comp Str. Psi |
|---|---|---|---|---|---|---|---|
| 3 P25 | 1606.1 | 1468.3 | | 1599.2 | 16.3 | 9760 | |

*Specimens were soak impregnated for 14 days at 75° C. with EPON ® 826,828, and 828/812 (50—50 by wt) after they received this drying condition.

TABLE III

| Specimen | $W_s$ Saturated Gm | $W_o$* 24 Hr at 105° C Gm | Resin System and Polymerization Temp | $W_f$ Impregnated Gm | % Vol. Loaded | Comp Str Psi | Ave Comp Str. Psi |
|---|---|---|---|---|---|---|---|
| 5 P1 | 1625.8 | 1505.8 | 828/812 | 1623.1 | 14.7 | 7850 | 8490 |
| 5 P2 | 1613.6 | 1511.7 | 175° C. | 1611.1 | 12.4 | 8840 | |
| 5 P3 | 1636.4 | 1537.1 | | 1629.0 | 11.5 | 8770 | |
| 5 P4 | 1638.4 | 1517.1 | 828/812 | 1633.5 | 14.5 | 6290 | 5845 |
| 5 P5 | 1642.8 | 1514.0 | 200° C | 1639.3 | 15.6 | 3040 | |
| 5 P6 | 1598.7 | 1501.3 | | 1586.2 | 10.6 | 8205 | |
| 5 P7 | 1653.7 | 1534.6 | 828/812 | 1651.2 | 14.6 | 3180 | 4340 |
| 5 P8 | 1627.7 | 1512.4 | 250° C. | 1626.8 | 14.3 | 5230 | |
| 5 P9 | 1612.3 | 1509.8 | | 1607.2 | 12.2 | 4600 | |

*Specimens were soak impregnated for 7 days at 75° C. with EPON ® 828/812 (50—50) mixture after they received the drying condition.

We claim:

1. A process for impregnating concrete which comprises:
   (a) partially drying said concrete to a moisture content of from about 4% to about 8% by weight,
   (b) impregnating said dried concrete by allowing it to absorb a liquid epoxy devoid of catalyst at elevated temperature and at atmospheric pressure, and
   (c) curing said epoxy resin in situ by heating said impregnated concrete to a temperature of from about 150° to about 200° C. for at least about 24 hours, using as catalyst the water remaining in said partially dried concrete.

2. The process of claim 1 wherein the drying is carried out to a moisture content of about 4% by weight.

3. The process of claim 2 wherein curing of the impregnated concrete is carried out at about 175° C.

4. A method for increasing the strength and corrosion properties of large concrete structures in the field which comprises:
   (a) partially drying said concrete to a moisture content of from about 4% to about 8% by weight,
   (b) impregnating said dried concrete by allowing it to absorb a liquid epoxy resin devoid of catalyst at elevated temperature and at atmospheric pressure, and
   (c) curing said epoxy resin in situ by heating said impregnated concrete to a temperature of from about 150° to about 200° C. for at least about 24 hours, using as catalyst the water remaining in said partially dried concrete.

* * * * *